United States Patent
Rogers (10) Patent No.: US 9,797,112 B1
(45) Date of Patent: Oct. 24, 2017

(54) MOBILE WEED-SIFTING APPARATUS AND ASSOCIATED USE THEREOF

(71) Applicant: Adrienne Rogers, St. Albans, NY (US)

(72) Inventor: Adrienne Rogers, St. Albans, NY (US)

( * ) Notice: Subject to any disclaimer, the term of this patent is extended or adjusted under 35 U.S.C. 154(b) by 0 days.

(21) Appl. No.: 15/419,665

(22) Filed: Jan. 30, 2017

Related U.S. Application Data (60) Provisional application No. 62/288,602, filed on Jan. 29, 2016.

(51) Int. Cl.
| | |
|---|---|
| B07B 1/28 | (2006.01) |
| E02F 7/00 | (2006.01) |
| B07B 1/22 | (2006.01) |
| B07B 1/00 | (2006.01) |

(52) U.S. Cl.
CPC .............. *E02F 7/00* (2013.01); *B07B 1/005* (2013.01); *B07B 1/22* (2013.01); *B07B 1/288* (2013.01)

(58) Field of Classification Search
CPC .. B07B 1/005; B07B 1/02; B07B 1/28; B07B 1/288; B07B 1/42; A01G 31/02
USPC ....................... 209/279, 417, 420; 460/79–81
See application file for complete search history.

(56) References Cited

U.S. PATENT DOCUMENTS

| | | | | |
|---|---|---|---|---|
| 3,729,096 A | * | 4/1973 | Fitzner ...................... | B07B 1/22 209/296 |
| 3,957,631 A | * | 5/1976 | Santo ........................ | B07B 1/22 209/288 |
| D265,094 S | * | 6/1982 | Williams .................. | B07B 1/22 D15/147 |
| 4,915,826 A | * | 4/1990 | Nordhus ................... | B07B 1/24 209/247 |
| 5,732,827 A | * | 3/1998 | Dorscht .................. | B07B 1/005 209/284 |
| 6,019,227 A | * | 2/2000 | May, III ............. | A01K 67/0332 209/284 |
| 6,584,650 B1 | * | 7/2003 | Pettigrew ................. | D01G 9/02 19/200 |
| 6,892,516 B1 | * | 5/2005 | Ardagna .................. | A01B 1/00 209/421 |
| 9,358,583 B1 | * | 6/2016 | Kahn ........................ | B07B 1/42 |
| 2002/0144935 A1 | * | 10/2002 | Tims ........................ | B07B 1/02 209/235 |
| 2011/0100882 A1 | * | 5/2011 | Beam ...................... | B07B 1/005 209/252 |
| 2014/0346092 A1 | * | 11/2014 | Kimura .................. | E01H 12/00 209/235 |

\* cited by examiner

*Primary Examiner* — Joseph C Rodriguez (57) ABSTRACT

A mobile weed-sifting apparatus includes a manually-operated mobile frame including a primary fulcrum axis, and a secondary fulcrum axis disposed above the primary fulcrum axis and registered parallel thereto. Notably, a weed-sifting mechanism is rotatably and removably coupled to the mobile frame. Advantageously, the weed-sifting mechanism rotates in clockwise and counter clockwise directions about the secondary fulcrum axis as the mobile frame is displaced along forward and rearward directions, respectively, along a ground surface.

14 Claims, 7 Drawing Sheets

MOBILE WEED-SIFTING APPARATUS AND ASSOCIATED USE THEREOF

CROSS REFERENCE TO RELATED APPLICATIONS

This is a non-provisional patent application that claims the benefit of U.S. provisional patent application No. 62/288,602 filed Jan. 29, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to gardening tools and, more particularly, to a mobile weed-sifting apparatus that removes dirt from unearthed weeds, and returns the excess lingering dirt back to the earth thereby separating valuable, nutrient rich dirt and soil from plucked weeds while offering a place to hold discarded weeds as one works.

PRIOR ART

Gardening and landscaping are important and satisfying aspects of home ownership for both men and women. As these activities allow people to use both the intellect and physical strength, they can contribute different talents to creating something that is both tangible and enjoyable. Whether bordering a home with a vibrant collection of floral beauties, pruning hedges to alluring and intricate shapes, fashioning a vegetable garden to supply fresh foods, or simply mowing a lawn to attractive precision, lawn and garden enthusiasts find joy, relaxation, and a sense of accomplishment in improving the outside appearance of their home.

While yard work can provide satisfaction for the spirit and exercise for the body, many who relish the opportunity to participate in landscaping and gardening activities sometimes encounter challenges in their beautification endeavors. Particularly, keeping up with all the tools and accessories required for particular gardening jobs can be a daunting process. One specific gardening chore that requires the use of more than one tool is weeding. To remove excessive vegetation from around vegetable plants and flowers, a sharp-bladed garden hoe is typically employed.

Once the weeds have been uprooted, a rake is then used to collect the debris into a neat file for easy disposal. However, many may find that after they have cleaned away the weeds with the rake there are still some left behind that were missed with the hoe. As a result, the gardener has to retrieve the hoe once again, finish the weeding job, and again pick up the rake to clean. Time consuming; such a back-and-forth exchange between two separate tools can turn a gratifying outdoor project into one of frustration.

In addition, those who suffer from limited mobility and limited physical capabilities may find weeding to be an almost impossible chore. Despite a willingness, and a desire, to cultivate weeds from a flower bed or a row of vegetable plants, those suffering from physical disabilities are forced by painful limitations to refrain from the constant bending and crouching required to successfully remove weeds.

Accordingly, a need remains for a mobile weed-sifting apparatus in order to overcome at least one prior art shortcoming. The exemplary embodiment(s) satisfy such a need by providing a mobile weed-sifting apparatus that removes dirt from unearthed weeds, and returns the excess lingering dirt back to the earth that is convenient and easy to use, lightweight yet durable in design, versatile in its applications, and designed for separating valuable, nutrient rich dirt and soil from plucked weeds while offering a place to hold discarded weeds as one works.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a mobile weed-sifting apparatus for separating dirt from weeds. These and other objects, features, and advantages of the non-limiting exemplary embodiment(s) are provided by a mobile weed-sifting apparatus including a manually-operated mobile frame including a primary fulcrum axis, and a secondary fulcrum axis disposed above the primary fulcrum axis and registered parallel thereto. Notably, a weed-sifting mechanism is rotatably and removably coupled to the mobile frame. Advantageously, the weed-sifting mechanism rotates in clockwise and counter clockwise directions about the secondary fulcrum axis as the mobile frame is displaced along forward and rearward directions, respectively, along a ground surface.

In a non-limiting exemplary embodiment, the mobile frame includes an annular top rim having an inner circumferential edge and an outer circumferential edge spaced therefrom, a handle pivotally coupled to the outer circumferential edge, and a plurality of linear support legs attached to the annular top rim and extending downwardly towards the secondary fulcrum axis. In this manner, the support legs are vertically oriented and registered orthogonal to each of the primary fulcrum axis and the secondary fulcrum axis.

In a non-limiting exemplary embodiment, the mobile frame further includes a plurality of diametrically opposed brackets fixedly attached along the inner circumferential edge of the top rim.

In a non-limiting exemplary embodiment, the mobile frame further includes a primary axle aligned along the primary fulcrum axis and has axially opposed ends engaged with the support legs respectively. Such axially opposed ends are seated laterally exterior of the support legs, respectively. A plurality of wheels are statically coupled to the opposed ends of the primary axle, respectively, and a plurality of pedals are statically mated to the primary axle. Advantageously, the primary axle, the wheels, and the pedals synchronously rotate along clockwise and counter clockwise directions about the primary fulcrum axis as the frame is displaced along the forward and rearward directions, respectively.

In a non-limiting exemplary embodiment, the mobile frame further includes a plurality of handles fixedly coupled to the opposed ends of the primary axle and seated laterally away from the wheels, respectively.

In a non-limiting exemplary embodiment, the weed-sifting mechanism includes an orb detachable engaged to the top rim, and an inner basket statically seated inside of the orb. Advantageously, as the primary axle rotates about the primary fulcrum axis, the pedals selectively rub against the orb and synchronously articulate the orb and the inner basket along the clockwise and the counter clockwise directions about the secondary fulcrum axis.

In a non-limiting exemplary embodiment, the weed-sifting mechanism further includes a driven axle centrally aligned along the secondary fulcrum axis and fixedly coupled to the orb, and a plurality of rollers rotatably attached to the driven axle. Notably, such rollers are seated exterior of the orb and frictionally engaged with the brackets, respectively. A plurality of latches are attached to the inner basket and detachably engaged with the driven axle.

In a non-limiting exemplary embodiment, the driven axle is fixedly connected to the orb and detachably engaged with the inner basket.

The present disclosure further includes a method of utilizing a mobile weed-sifting apparatus for separating dirt from weeds. Such a method includes the steps of: providing a manually-operated mobile frame including a primary fulcrum axis and a secondary fulcrum axis disposed above the primary fulcrum axis and registered parallel thereto; providing a weed-sifting mechanism; rotatably and removably coupling the weed-sifting mechanism to the mobile frame; and displacing the mobile frame in forward and rearward directions along a ground surface thereby causing the weed-sifting mechanism to rotate in clockwise and counter clockwise directions about the secondary fulcrum axis.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-6 and is/are intended to provide a mobile weed-sifting apparatus 10 that removes dirt from unearthed weeds, and returns the excess lingering dirt back to the earth thereby separating valuable, nutrient rich dirt and soil from plucked weeds while offering a place to hold discarded weeds as one works. It should be understood that the exemplary embodiment may be used to separate dirt from a variety of plants and/or weeds, and should not be limited to any particular plant and/or weed described herein.

Referring to FIGS. 1-6, the mobile weed-sifting apparatus 10 includes a manually-operated mobile frame 11 including a primary fulcrum axis 12, and a secondary fulcrum axis 13 disposed above the primary fulcrum axis 12 and registered parallel thereto. Notably, a weed-sifting mechanism 14 is rotatably and removably coupled to the mobile frame 11. Advantageously, the weed-sifting mechanism 14 rotates in clockwise and counter clockwise directions 15, 16 about the secondary fulcrum axis 13 as the mobile frame 11 is displaced along forward and rearward directions 17, 18, respectively, along a ground surface. Such forward and rearward directions are shown as rotational travel paths but it is understood that the apparatus 10 moves along generally linear travel paths along the ground surface.

In a non-limiting exemplary embodiment, the mobile frame 11 includes an annular top rim 19 having an inner circumferential edge 20 and an outer circumferential edge 21 spaced therefrom, a handle 41 pivotally coupled to the outer circumferential edge 21, and a plurality of linear support legs 22, 22a attached to the annular top rim 19 and extending downwardly towards the secondary fulcrum axis 13. In this manner, the support legs 22, 22a are vertically oriented and registered orthogonal to each of the primary fulcrum axis 12 and the secondary fulcrum axis 13.

In a non-limiting exemplary embodiment, the mobile frame 11 further includes a plurality of diametrically opposed brackets 23, 24 fixedly attached along the inner circumferential edge 20 of the top rim 19.

In a non-limiting exemplary embodiment, the mobile frame 11 further includes a primary axle 25 aligned along the primary fulcrum axis 12 and has axially opposed ends 25a, 25b engaged with the support legs 22, 22a, respectively. Such axially opposed ends 25a, 25b are seated laterally exterior of the support legs 22, 22a, respectively. A plurality of wheels 26, 27 are statically coupled to the opposed ends 25a, 25b of the primary axle 25, respectively, and a plurality of pedals 28, 29 are statically mated to the primary axle 25. Advantageously, the primary axle 25, the wheels 26, 27, and the pedals 28, 29 synchronously rotate along clockwise and counter clockwise directions 15, 16 about the primary fulcrum axis 12 as the frame 11 is displaced along the forward and rearward directions 17, 18, respectively.

In a non-limiting exemplary embodiment, the mobile frame 11 further includes a plurality of handles 30, 31 fixedly coupled to the opposed ends 25a, 25b of the primary axle 25 and seated laterally away from the wheels 26, 27, respectively.

In a non-limiting exemplary embodiment, the weed-sifting mechanism 14 includes an orb 32 detachably engaged to the top rim 19, and an inner basket 33 statically seated inside of the orb 32. Advantageously, as perhaps best shown in FIGS. 4, 4A, as the primary axle 25 rotates about the primary fulcrum axis 12, the pedals 28, 29 selectively rub against the orb 32 and synchronously articulate the orb 32 and the inner basket 33 along the clockwise and the counter clockwise directions 15, 16 about the secondary fulcrum axis 13.

In a non-limiting exemplary embodiment, the weed-sifting mechanism 14 further includes a driven axle 34 centrally aligned along the secondary fulcrum axis 13 and fixedly coupled to the orb 32, and a plurality of rollers 35, 36 rotatably attached to the driven axle 34. Notably, such rollers 35, 36 are seated exterior of the orb 32 and frictionally engaged with the brackets 23, 24, respectively. A plurality of latches 37, 38 are attached to the inner basket 33 and detachably engaged with the driven axle 34.

Figures 1, 1A:
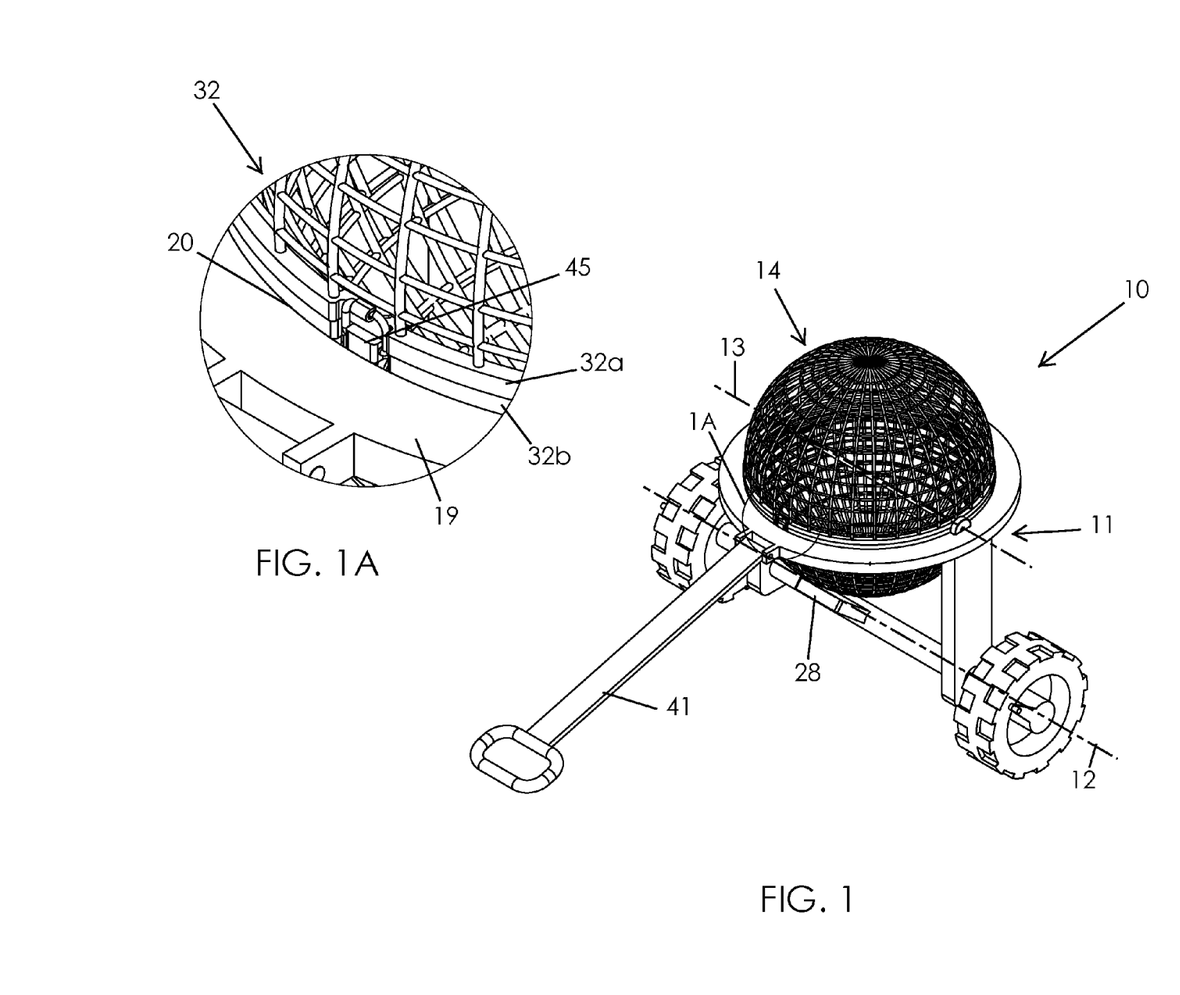
FIG. 1 is a perspective view of a mobile weed-sifting apparatus, in accordance with a non-limiting exemplary embodiment.
FIG. 1A is an enlarged view of a lock attached to an orb shown in FIG. 1.
Figure 2:
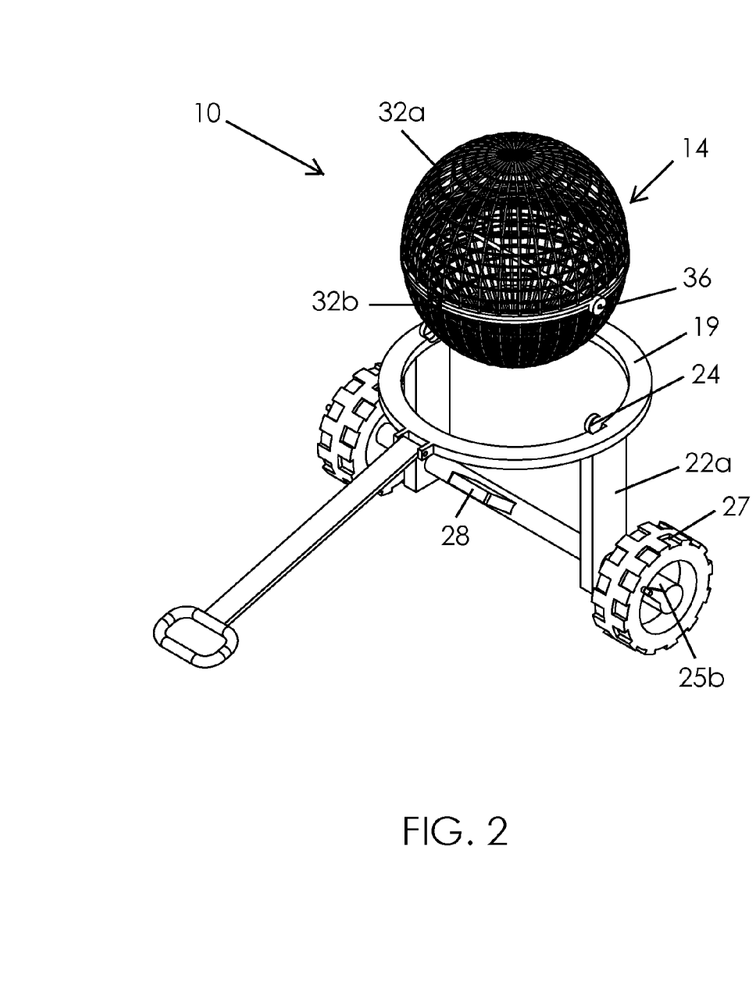
FIG. 2 is a partially exploded view showing the orb and inner basket removed from the mobile frame.
Figure 2A:
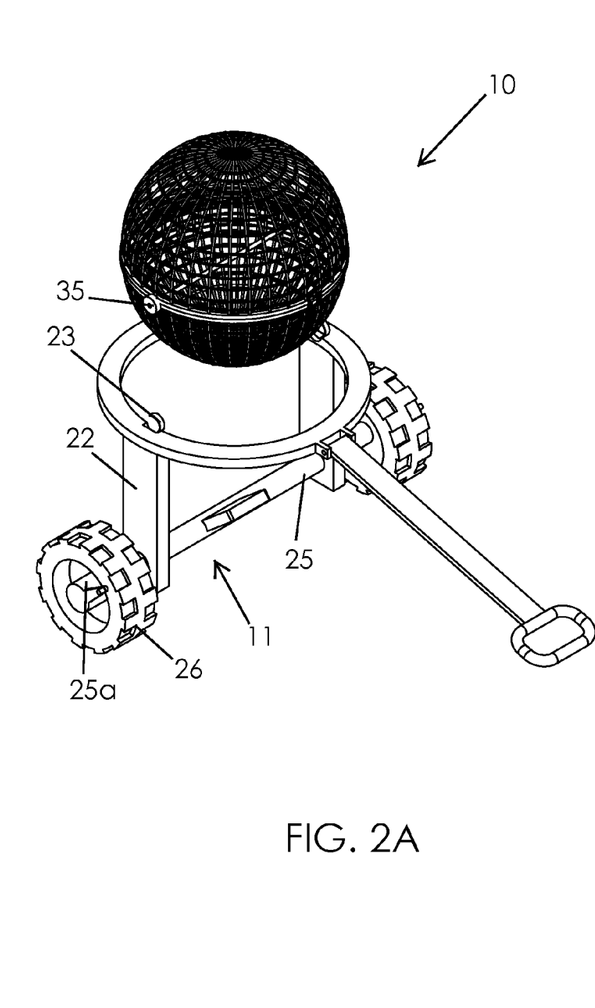
FIG. 2A is another partially exploded view showing the orb and inner basket removed from the mobile frame.
Figures 3, 3A:
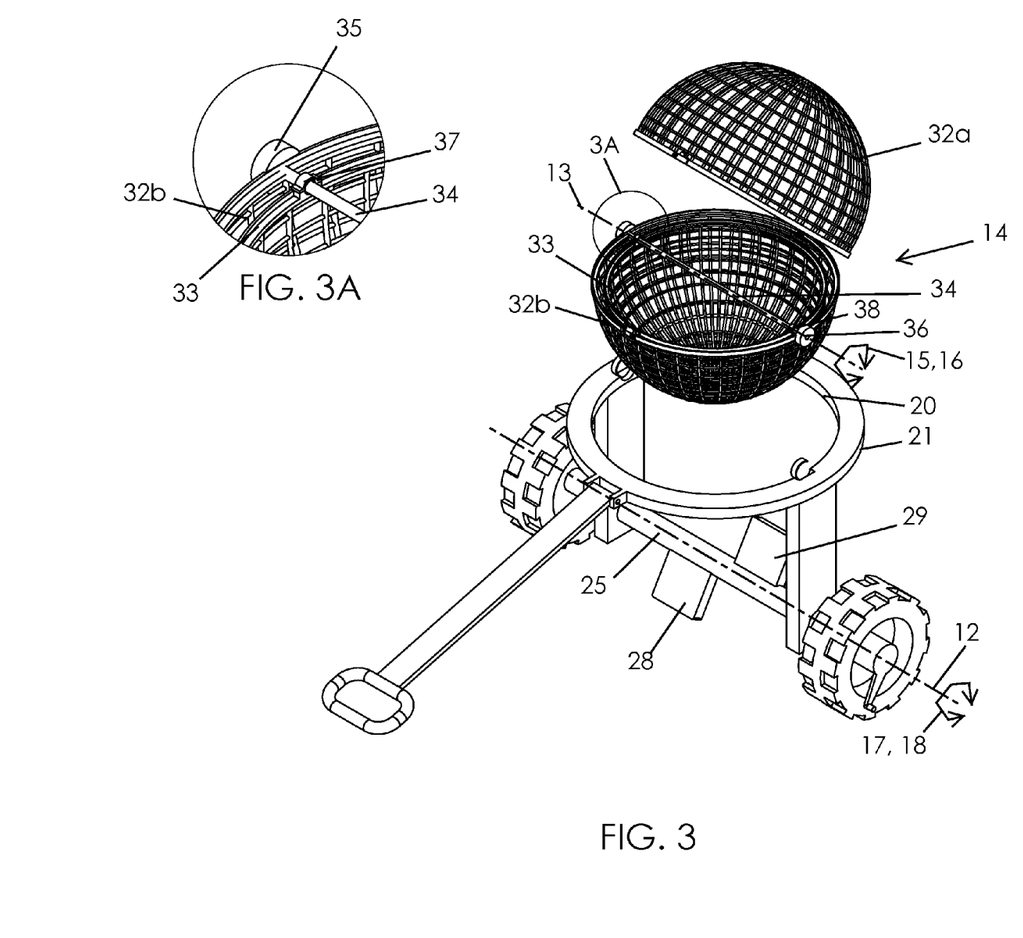
FIG. 3 is yet another partially exploded view showing the orb and inner basket removed from the mobile frame wherein the orb is at an open position.
FIG. 3A is an enlarged view showing the interrelationship between the secondary axle, orb and inner basket.
Figure 4:
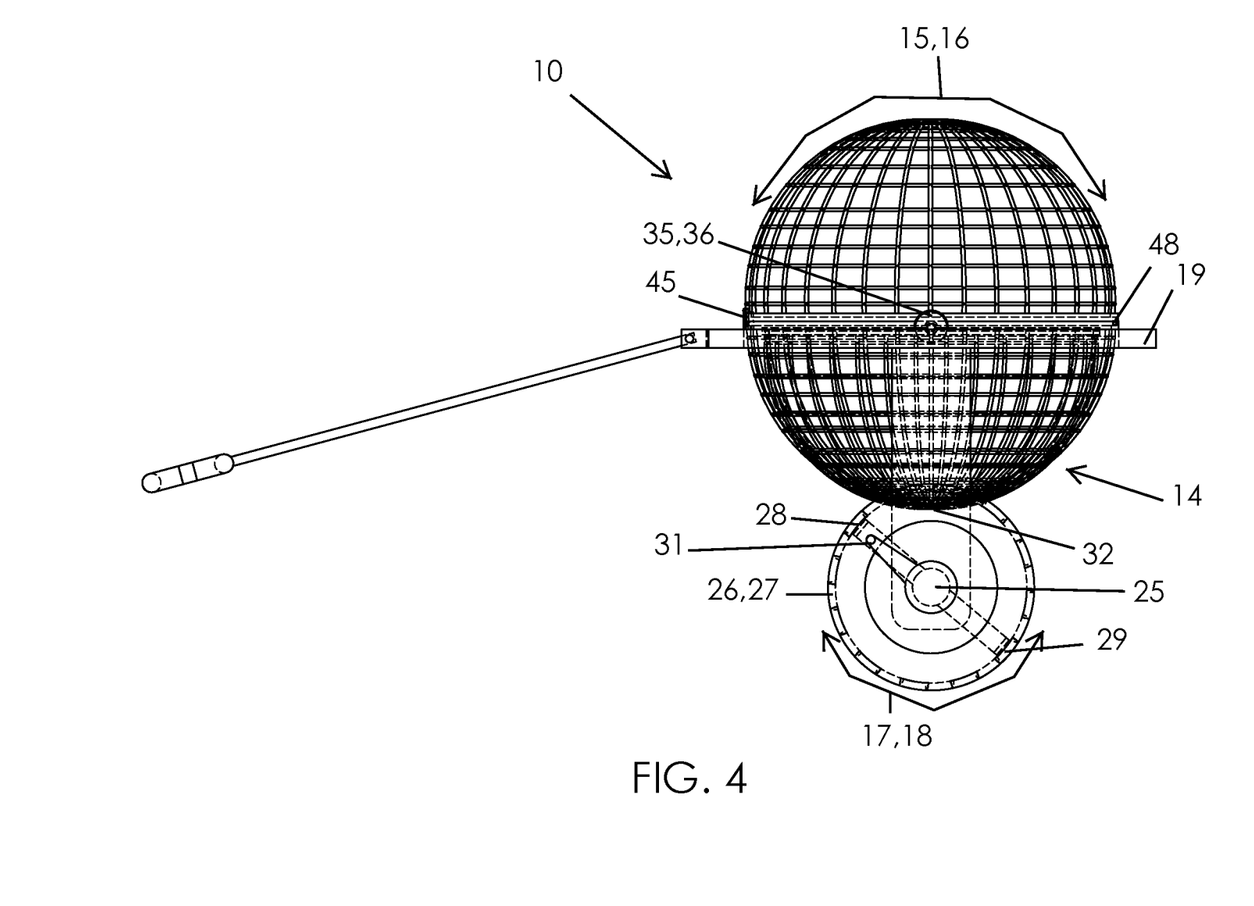
FIG. 4 is a side elevational view showing an initial position of the pedals just before rubbing against a bottom of the orb.
Figure 4A:
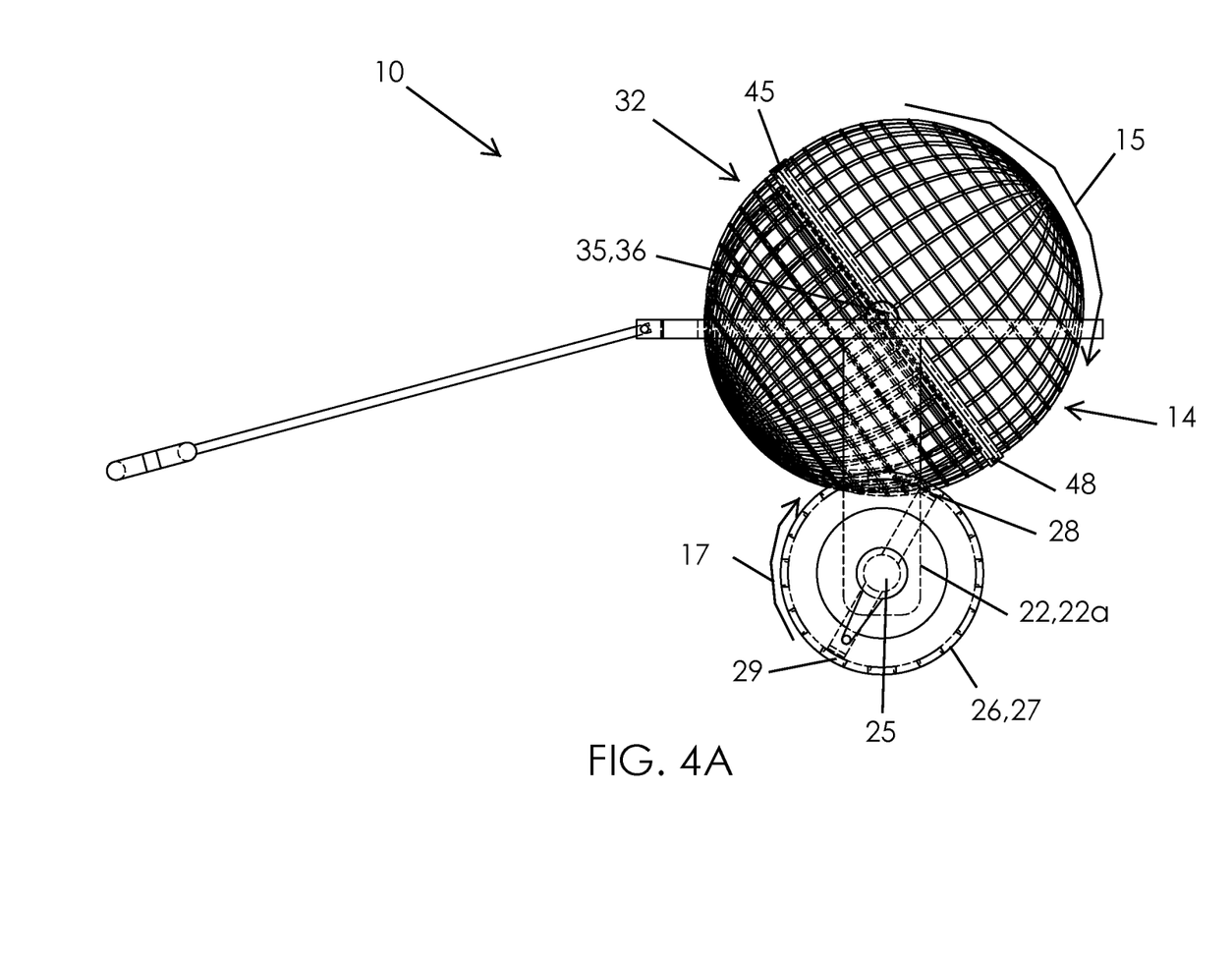
FIG. 4A is a side elevational view showing a subsequent rotated position of the pedals and the orb just after the pedals rub against an outer surface of the orb.
Figure 5:
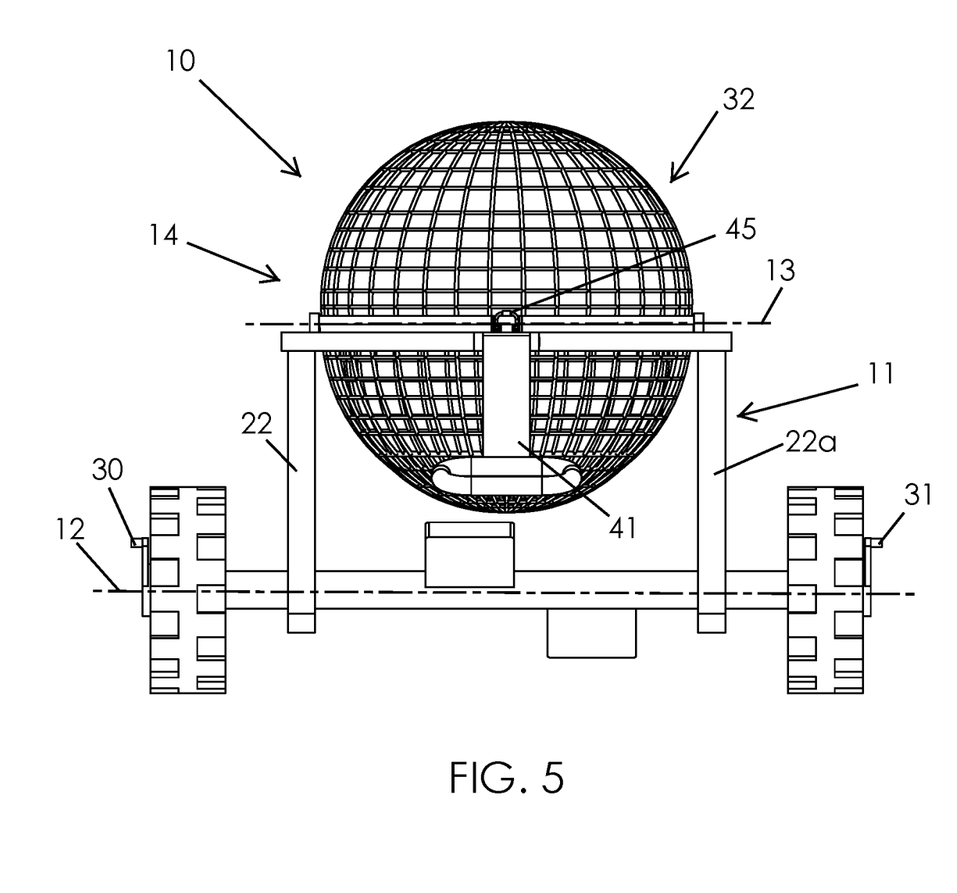
FIG. 5 is a front elevational view of the mobile weed-sifting apparatus shown in FIG. 4.
Figure 6:
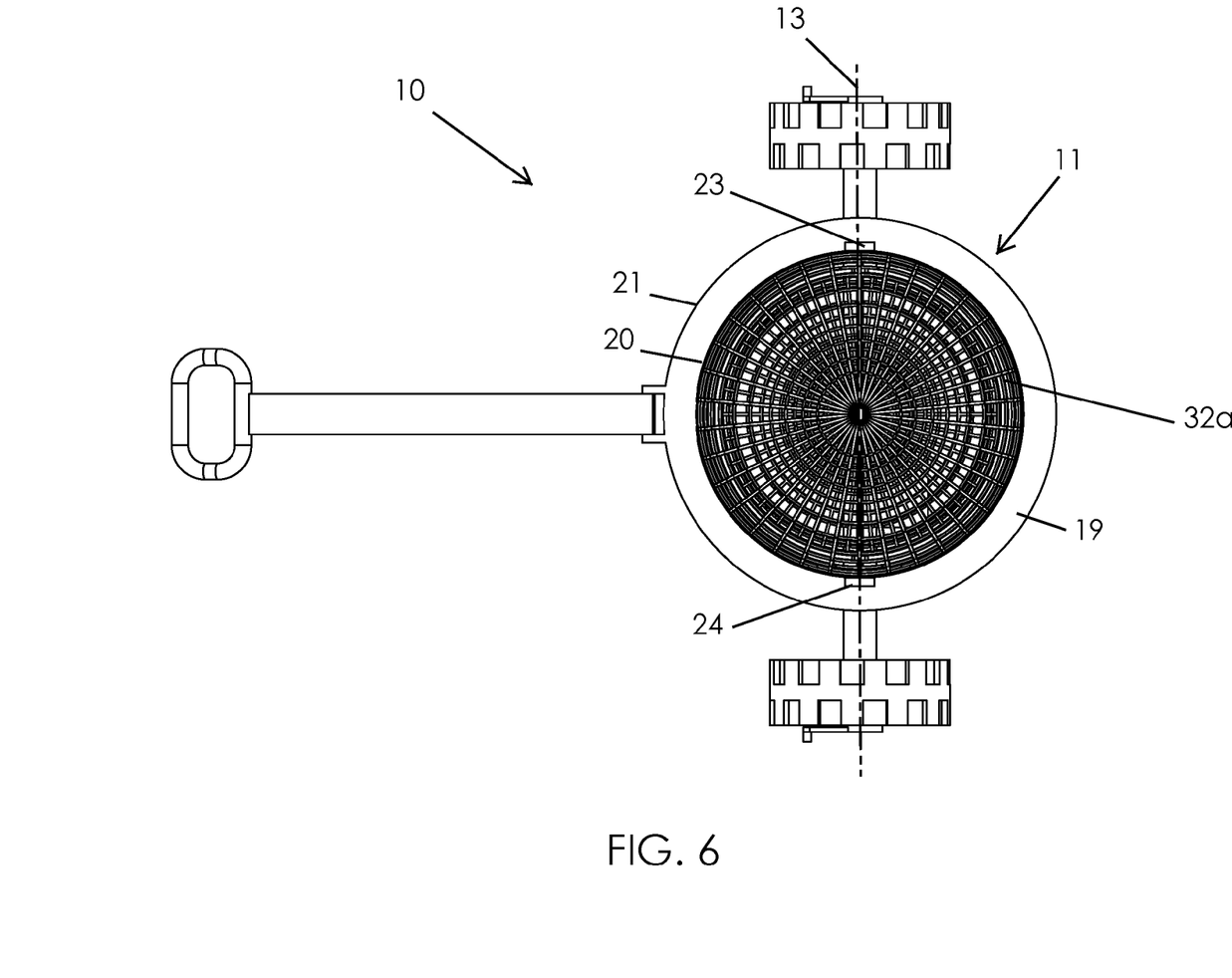
FIG. 6 is a top plan view of the mobile weed-sifting apparatus shown in FIG. 1.

In a non-limiting exemplary embodiment, orb 32 includes a dome-shaped upper half 32a and a dome-shaped lower half 32b. Lock 45 keeps upper half 32a secured to lower half 32b during rotational movement. Hinge 48 pivotally connected upper half 32a to lower half 32b.

In a non-limiting exemplary embodiment, the driven axle 34 is fixedly connected to the orb 32 and detachably engaged with the inner basket 33 (via latches 37, 38). Thus, the inner basket 33 is situated within lower half 32b and is fixed relative thereto via latches 37, 38 and driven axle 34.

The present disclosure further includes a method of utilizing a mobile weed-sifting apparatus 10 for separating dirt from weeds. Such a method includes the steps of: providing a manually-operated mobile frame 11 including a primary fulcrum axis 12 and a secondary fulcrum axis 13 disposed above the primary fulcrum axis 12 and registered parallel thereto; providing a weed-sifting mechanism 14; rotatably and removably coupling the weed-sifting mechanism 14 to the mobile frame 11; and displacing the mobile frame 11 in forward and rearward directions 17, 18 along a ground surface thereby causing the weed-sifting mechanism 14 to rotate in clockwise and counter clockwise directions 15, 16 about the secondary fulcrum axis 13.

Referring to the figures in general, in a non-limiting exemplary embodiment, the mobile weed-sifting apparatus 10 is an all-encompassing tool that is designed to allow users, from an upright position, to roll the frame 11 along the weed path, wherein the weed-sifting mechanism 14 is able to process the weeds while releasing the dirt back onto the earth. Fabricated of a durable, hard plastic material, the mobile weed-sifting apparatus 10 includes an elongated handle 41 attached to frame 11. The handle 41 may measure a copious twenty-six inches (26") in length, easily accommodating users of any stature. At the base of the handle 41, the weed-sifting mechanism 14 may take the form of an enlarged, circular orb 32, with a smaller inner basket 33 mesh inside the orb 32, allowing easy removal of weeds once finished using.

The apparatus 10 may come in two sizes, small and medium. Offering dimensions of fifteen inches (15") in length, thirteen inches (13") in width, eleven inches (11") in depth, and forty inches (40") in circumference, and the orb 32 would be axle-enhanced to allow the unit to open halfway, wherein it is able to "house" weeds and dirt at the same time. Up to two (2) "pedal poppers" (pedals 28, 29) hit the orb 32 allowing it to spin. This action releases any captured dirt through a series of small egress holes (mesh) peppering the entirety of the orb 32, while keeping only the weeds therein. The orb 32 opens up manually so dirt and weeds can be housed within it. Once the orb 32 is closed, the handle 41 allows you to push the frame 11 back and forth along a ground surface.

The "pedal poppers" (pedals 28, 29) underneath hits the orb 32 causing it to spin. All dirt will fall out of the holes (mesh), while the weeds remain in the orb 32. The orb 32 is removable so the weeds can be disposed of. The orb 32 would be propelled via two (2) cast wheels 26, 27, one on each side of the frame 11, that are able to gently yet effectively navigate lawn and garden terrain. As constructed, the user would simply shovel the dirt/debris into the orb 32 mobile weed-sifting apparatus 10. The orb 32 opens up half way, allowing shovel, weed and dirt to be placed in the inner basket 33, while disseminating the dirt that gets sifted. The user would manually shovel the dirt, which is then captured, as mentioned, released back out of the orb 32 and inner basket 33. The user needs only to shovel the dirt into the mobile weed-sifting mechanism 14 and dispose of the weeds.

The mobile weed-sifting apparatus 10 offers a number of important benefits and advantages. Foremost, this handy product provides users with one convenient garden tool that can both remove and collect weeds while also sifting out excess dirt. A specially configured rolling frame 11, the mobile weed-sifting apparatus 10 eliminates the need to juggle two separate, unwieldy tools when undertaking weeding tasks. As a result, gardeners do not have to continuously switch between a hoe and a rake when ridding vegetable plants and flowers from errant sprigs of vegetation.

Moreover, the mobile weed-sifting apparatus 10 handily alleviates overexertion on the arms and back, allowing yard workers to complete weeding tasks in a pain free manner. This practical gardening accessory assists all users, especially those who have limited physical capabilities, with their gardening and landscaping activities. Enabling them to experience the joy and satisfaction that can be gleaned from working outside, the mobile weed-sifting apparatus 10 permits disabled outdoor enthusiasts to participate in the beautification of their home without limitations. As such, the mobile weed-sifting apparatus 10 fosters a renewed sense of independence and self-sufficiency in elderly patients afflicted with arthritis or similar ailments.

Additionally, this product proves invaluable to anyone with mobility challenges, from sufferers of palsy or scoliosis to those recovering from temporary disabilities stemming from surgery or broken bones. Extremely easy to use, the mobile weed-sifting apparatus 10 may be operated with one hand, freeing the other for one to engage in a telephone conversation as he or she works. Other than pushing the debris into the orb 32, the mobile weed-sifting apparatus 10 streamlines the process of cultivating land. While primarily conceived with household users in mind, professional gardeners, landscape architects, and groundskeepers will certainly appreciate the time-saving benefits this versatile product affords. The push toward local organic farming is one that has been taking place on a national level.

There is a heightened sophistication on the part of consumers, (Whole Foods customers and their ilk, people who want to feed both their bodies and their social consciences). As such, the mobile weed-sifting apparatus 10 is cleverly timed. The trend toward smaller farming can be seen locally in farm Census data. While the number of farms in Maryland has fallen from 39,000 in 1950 to about 12,200 in 2012, the number of niche farms of 10 to 49 acres grew from 3,979 in 1992 to 4,412 in 2012. In Virginia, such farms grew from 10,361 in 1992 to 14,082 in 2012. Whole Foods recently announced a heightened focus on buying local produce, including a $10 million budget to promote local agriculture. All of these developments are positive ones, in terms of the usefulness of the mobile weed-sifting apparatus 10 in the current market.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A mobile weed-sifting apparatus for separating dirt from weeds, said mobile weed-sifting apparatus comprising:
 a mobile frame including
  a primary fulcrum axis, and
  a secondary fulcrum axis disposed above said primary fulcrum axis and registered parallel thereto; and
 a weed-sifting mechanism rotatably coupled to said mobile frame;
 wherein said weed-sifting mechanism rotates in clockwise and counter clockwise directions about said secondary fulcrum axis as said mobile frame is displaced along forward and rearward directions, respectively, along a ground surface;

wherein said mobile frame comprises
an annular top rim having an inner circumferential edge and an outer circumferential edge spaced therefrom;
a handle pivotally coupled to said outer circumferential edge; and
a plurality of linear support legs attached to said annular top rim and extending downwardly towards said secondary fulcrum axis;
wherein said support legs are vertically oriented and registered orthogonal to each of said primary fulcrum axis and said secondary fulcrum axis.

2. The mobile weed-sifting apparatus of claim 1, wherein said mobile frame further comprises:
a plurality of diametrically opposed brackets fixedly attached along said inner circumferential edge of said top rim.

3. The mobile weed-sifting apparatus of claim 2, wherein said mobile frame further comprises:
a primary axle aligned along said primary fulcrum axis and having axially opposed ends engaged with said support legs respectively, said axially opposed ends being seated laterally exterior of said support legs, respectively;
a plurality of wheels statically coupled to said opposed ends of said primary axle, respectively;
a plurality of pedals statically mated to said primary axle; and
wherein said primary axle, said wheels, and said pedals synchronously rotate along clockwise and counter clockwise directions about said primary fulcrum axis as said frame is displaced along said forward and rearward directions, respectively.

4. The mobile weed-sifting apparatus of claim 3, wherein said mobile frame further comprises:
a plurality of handles fixedly coupled to said opposed ends of said primary axle and seated laterally away from said wheels, respectively.

5. The mobile weed-sifting apparatus of claim 3, wherein said weed-sifting mechanism comprises:
an orb detachable engaged to said top rim; and
an inner basket statically seated inside of said orb;
wherein, as said primary axle rotates about said primary fulcrum axis, said pedals selectively rub against said orb and synchronously articulate said orb and said inner basket along said clockwise and said counter clockwise directions about said secondary fulcrum axis.

6. The mobile weed-sifting apparatus of claim 5, wherein said weed-sifting mechanism further comprises:
a driven axle centrally aligned along said secondary fulcrum axis and fixedly coupled to said orb;
a plurality of rollers rotatably attached to said driven axle, said rollers being seated exterior of said orb and frictionally engaged with said brackets, respectively; and
a plurality of latches attached to said inner basket and detachably engaged with said driven axle.

7. The mobile weed-sifting apparatus of claim 6, wherein said driven axle is fixedly connected to said orb and detachably engaged with said inner basket.

8. A mobile weed-sifting apparatus for separating dirt from weeds, said mobile weed-sifting apparatus comprising:
a manually-operated mobile frame including
a primary fulcrum axis, and
a secondary fulcrum axis disposed above said primary fulcrum axis and registered parallel thereto; and
a weed-sifting mechanism rotatably and removably coupled to said mobile frame;
wherein said weed-sifting mechanism rotates in clockwise and counter clockwise directions about said secondary fulcrum axis as said mobile frame is displaced along forward and rearward directions, respectively, along a ground surface;
wherein said mobile frame comprises:
an annular top rim having an inner circumferential edge and an outer circumferential edge spaced therefrom;
a handle pivotally coupled to said outer circumferential edge; and
a plurality of linear support legs attached to said annular top rim and extending downwardly towards said secondary fulcrum axis;
wherein said support legs are vertically oriented and registered orthogonal to each of said primary fulcrum axis and said secondary fulcrum axis.

9. The mobile weed-sifting apparatus of claim 8, wherein said mobile frame further comprises:
a plurality of diametrically opposed brackets fixedly attached along said inner circumferential edge of said top rim.

10. The mobile weed-sifting apparatus of claim 9, wherein said mobile frame further comprises:
a primary axle aligned along said primary fulcrum axis and having axially opposed ends engaged with said support legs respectively, said axially opposed ends being seated laterally exterior of said support legs, respectively;
a plurality of wheels statically coupled to said opposed ends of said primary axle, respectively;
a plurality of pedals statically mated to said primary axle; and
wherein said primary axle, said wheels, and said pedals synchronously rotate along clockwise and counter clockwise directions about said primary fulcrum axis as said frame is displaced along said forward and rearward directions, respectively.

11. The mobile weed-sifting apparatus of claim 10, wherein said mobile frame further comprises:
a plurality of handles fixedly coupled to said opposed ends of said primary axle and seated laterally away from said wheels, respectively.

12. The mobile weed-sifting apparatus of claim 10, wherein said weed-sifting mechanism comprises:
an orb detachable engaged to said top rim; and
an inner basket statically seated inside of said orb;
wherein, as said primary axle rotates about said primary fulcrum axis, said pedals selectively rub against said orb and synchronously articulate said orb and said inner basket along said clockwise and said counter clockwise directions about said secondary fulcrum axis.

13. The mobile weed-sifting apparatus of claim 12, wherein said weed-sifting mechanism further comprises:
a driven axle centrally aligned along said secondary fulcrum axis and fixedly coupled to said orb;
a plurality of rollers rotatably attached to said driven axle, said rollers being seated exterior of said orb and frictionally engaged with said brackets, respectively; and
a plurality of latches attached to said inner basket and detachably engaged with said driven axle.

14. The mobile weed-sifting apparatus of claim 13, wherein said driven axle is fixedly connected to said orb and detachably engaged with said inner basket.

* * * * *